A. A. WAITE.
STEERING GEAR.
APPLICATION FILED APR. 24, 1911.

1,043,178.

Patented Nov. 5, 1912.

3 SHEETS—SHEET 1.

A. A. WAITE.
STEERING GEAR.
APPLICATION FILED APR. 24, 1911.

1,043,178.

Patented Nov. 5, 1912.

3 SHEETS—SHEET 3.

Witnesses
F. E. Barry

Inventor
Alpha A. Waite

By
Attorneys

UNITED STATES PATENT OFFICE.

ALPHA A. WAITE, OF LA HARPE, KANSAS.

STEERING-GEAR.

1,043,178.  Specification of Letters Patent.  Patented Nov. 5, 1912.

Application filed April 24, 1911. Serial No. 622,966.

*To all whom it may concern:*

Be it known that I, ALPHA A. WAITE, a citizen of the United States, residing at La Harpe, in the county of Allen and State of Kansas, have invented certain new and useful Improvements in Steering-Gear, of which the following is a specification.

This invention relates to that class of plows which are self-propelled, a plow carriage being provided which is driven by a motor, preferably an internal combustion engine; and it is the object of the present invention to provide in a machine of this kind an improved steering gear provided with a lock therefor.

The invention is also applicable to other self-propelled vehicles.

In order that the invention may be better understood, reference is had to the accompanying drawings, forming a part of this specification in which drawings,—

Figure 1:
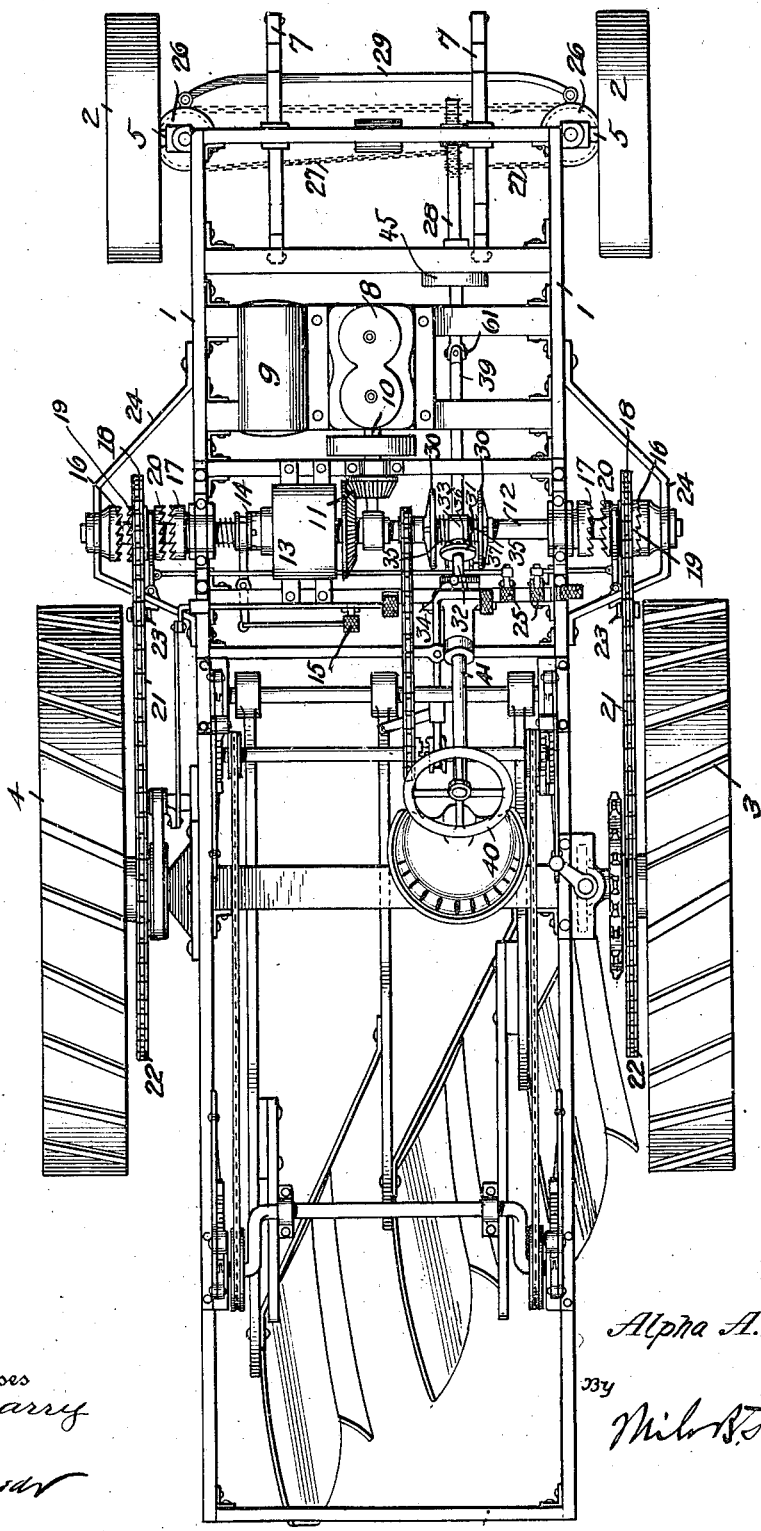
Figure 2:
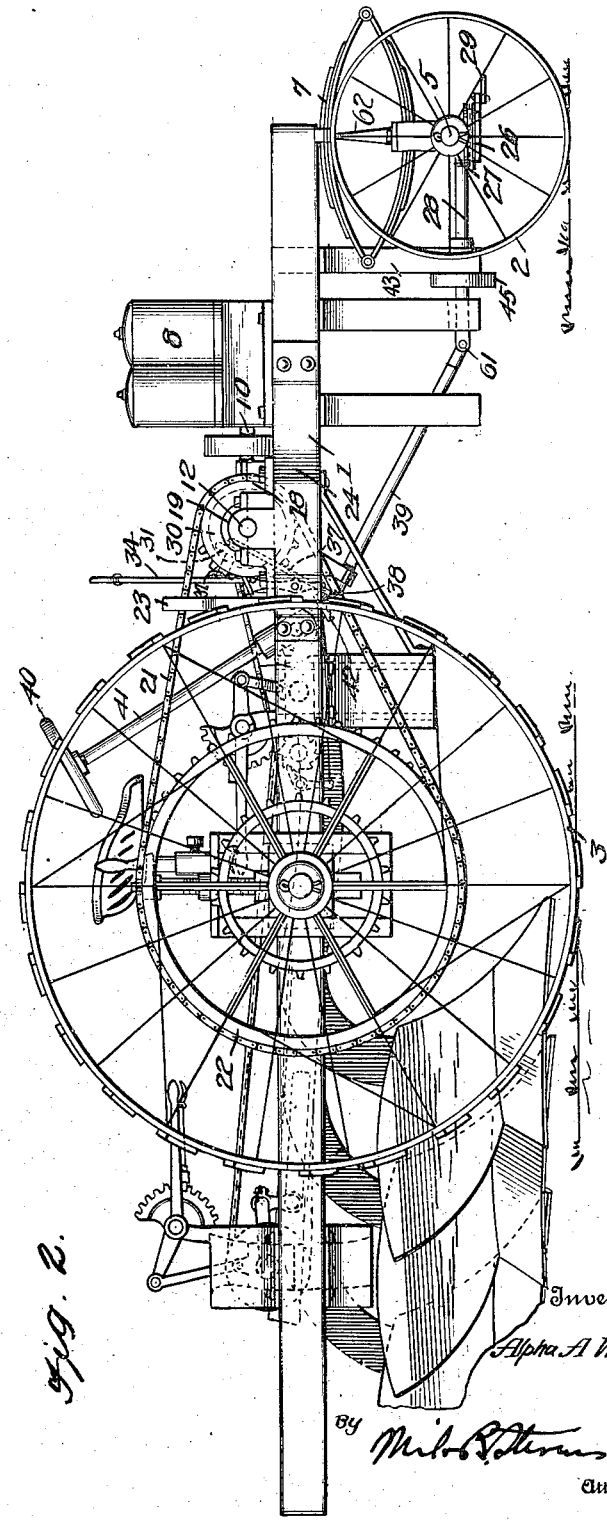
Figure 3:
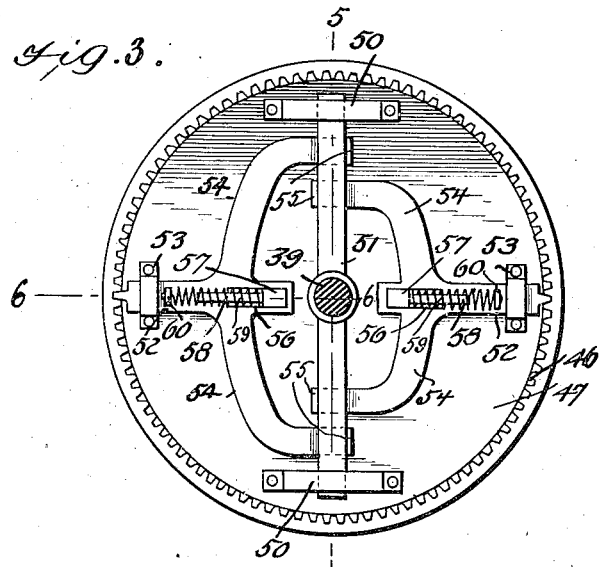
Figure 4:
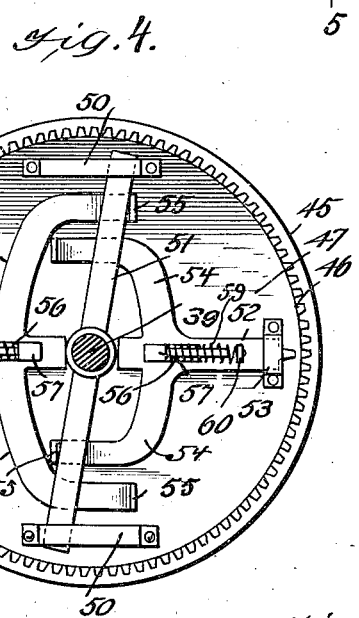
Figure 5:
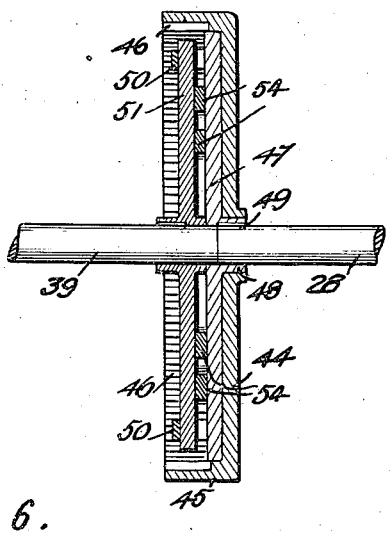
Figure 6:
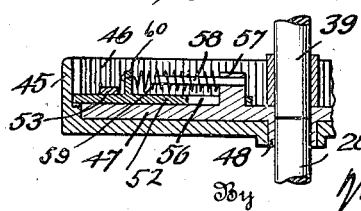

Figure 1 is a plan view of the machine; Fig. 2 is a side elevation thereof; Fig. 3 is a face view of the steering-gear lock; Fig. 4 is a view similar to Fig. 3 showing the parts in another position; Fig. 5 is a vertical section on the line 5—5 of Fig. 3; Fig. 6 is a horizontal section on the line 6—6 of Fig. 3.

Referring specifically to the drawings, 1 denotes the side bars of the chassis of a plow carriage having steering wheels 2 at the front, and traction wheels 3 and 4, respectively, at the rear, the wheel 3 being on the furrow side, and the wheel 4 on the land side. The steering wheels are carried by stub axles 5 which are pivotally connected to the front axle 6, and between the latter and the chassis are interposed elliptic springs 7.

On the chassis, near its front end, is mounted a motor 8 which may be an ordinary internal-combustion engine obtaining its fuel supply from a tank 9. The crank shaft 10 of the engine is connected by bevel gears 11 to a driving shaft 12 extending transversely of the carriage and mounted in suitable bearings carried by the side bars 1. A suitable transmission gearing is provided, the same being inclosed in a case 13. A clutch 14 is also provided, the same being operated by a foot pedal 15.

On each end of the driving shaft 12 are mounted two ratchet clutch-members 16 and 17, respectively, between which members is slidably mounted a sprocket wheel 18 having ratchet clutch-teeth 19 and 20, respectively, on opposite sides. The sprocket wheel 18 on one side of the machine is connected by a sprocket chain 21 to a sprocket wheel 22 connected to the traction wheel on the corresponding side of the machine, and the sprocket wheel 18 on the other side of the machine is geared in like manner to the traction wheel on that side of the machine.

The sprocket wheels 18 are adjustable so as to bring their clutch-teeth 19 into locking engagement with the teeth of the clutch-members 16, and their clutch-teeth 20 into engagement with the clutch-members 17. The sprocket wheels are loose on the shaft so that no motion is transmitted when they are disconnected from the clutch-members. The clutch-members 16 are designed to drive the sprocket wheels forwardly when the shaft is turning in that direction, and the clutch-members 17 drive the sprocket wheels in a reverse direction when the shaft is reversed. Suitable guides 23 for the chains 21 are provided. The extremities of the driving shaft 12 are supported in brackets 24 carried by the side bars 1.

By the herein described driving means, the machine can be run forward or back, and as the driving means of the two traction wheels are independent, either one of said wheels may be thrown out of gear when making turns. Foot pedals 25 are provided for shifting the sprocket wheels 18.

The stub axles 5 carry disks 26 having grooved peripheries to receive a steering chain 27. The chain passes around the disks, and extends inwardly to a shaft 28 on which it is wound in such a manner that when the shaft is rotated, the stub axles are swung on their pivots, thereby shifting the front wheels 2 to steer the machine. The disks 26 are also connected by a cross rod 29.

A hand, as well as a power, steering gear is provided. This mechanism comprises the following instrumentalities: Connected to the driving shaft 12, so as to rotate therewith, are two friction disks 30 between which is located a friction wheel 31 which latter is adjustable so that it may be placed in contact with either one of said disks according to the direction it is desired to steer the machine. The friction wheel is mounted on a shaft 32 supported at one end in a bearing sleeve 33 which loosely encircles the shaft 12 between the disks 30. The other end of the shaft is supported by a hand lever 34 which, when swung to one side or the other, shifts the shaft 32, and places the wheel in engagement with one or the other of the friction disks. The friction wheel is normally disengaged from both disks, it being held in this position by springs 35 interposed between said disks and the sleeve 33. On the shaft 32 is made fast a sprocket wheel 36 which is connected by a chain 37 to a sprocket wheel 38 on a shaft 39 connected to the winding shaft 28 in a manner to be presently described. The manual steering device is a hand wheel 40 carried by a shaft 41 which is geared to the shaft 39 by bevel gears 42.

If it is desired to steer the machine by power, it is necessary only to place the wheel 31 in engagement with one or the other of the friction disks 30, according to the direction the machine is to take, whereupon the motion of the shaft 12 is transmitted to the shaft 39, and the latter, by reason of its connection with the shaft 28, rotates the latter and through the chain 27 shifts the steering wheels as already described. The same action takes place when the shaft 39 is operated by hand from the steering wheel 40.

The following means are provided for locking the steering gear: To a bracket 43 carried by the side bars 1 is secured a disk 44 having an outstanding annular flange 45 at its periphery, the inner surface of which flange is formed with teeth 46 to form a circular rack. This flange incloses a disk 47 having a hub 48 extending into a central opening in the disk 44. The shaft 28 extends into this hub and is made fast therein by a key or other suitable device 49, the disk 47 being thereby connected to the shaft 28. To the face of the disk 47 are secured, at diametrically opposite points, guides 50 under which work the ends of a cross bar 51 carried by the shaft 39, said cross bar being made fast to the shaft by any suitable means. Behind this cross bar are located latches which are adapted to engage the teeth 46, the latter thus serving as a latch keeper. Each of these latches comprises a sliding bolt 52 working under a guide 53 carried by the disk 47, said bolt extending radially and being adapted to engage the teeth 46 when moved outwardly. The inner end of the bolt has two arms 54 which extend beneath the cross bar 51 on opposite sides of the shaft 39, the extremities of said arms terminating in upward bends 55 adapted to engage one edge of the cross bar. The other edge of the cross bar is engaged by the arms of the other sliding bolt, the two sliding bolts being located diametrically opposite each other. The bolt also has a longitudinal slot 56 through which extends a lug 57 on the disk 47, said lug carrying a pin 58 which is engaged by one end of a coiled spring 59, the other end of which spring is connected to a lug 60 on the bolt.

The purpose of this spring is to normally hold the bolt in engagement with the teeth 46.

The operation of the lock is as follows: When the shaft 39 is stationary, the bolts 52 are in engagement with the teeth 46 as shown in Fig. 3, and said shaft, as well as the shaft 28, are thus locked. The bent extremities of the arms 54 are in contact with the opposite edges of the cross bar 51. When the shaft 39 starts to rotate, the cross bar 51 rotates with it, in the same direction, this movement of the cross bar continuing until it is stopped by the ends of the guides 50, said guides thus serving as stops for limiting the swing of the cross bar. The cross bar, by reason of its engagement with the bends of the bolt arms 54, withdraws the bolts from the teeth 46, thus unlocking the disk 47 which now starts to turn with the shaft 39, the motion of said shaft being communicated to the disk by the engagement of the arms with the ends of the guides 50. Inasmuch as the shaft 28 is keyed or otherwise made fast to the disk 47, said shaft rotates with the disk, and the steering chain 57 is now operated. The herein described release of the bolts takes place irrespective of the direction in which the shaft 39 is rotated. Fig. 3 shows the bolts in release position. As soon as the shaft 39 is thrown out of gear, the cross bar 51 swings back to its normal position, whereupon the bolts 52 are advanced by the springs 58 to again engage the teeth 46, and thus lock the steering gear. The shaft 39 is in two sections which are connected by a universal joint 61.

I claim:

1. The combination with a steering shaft rotatable about its axis, said shaft being in sections; of a stationary latch keeper, latches adapted to engage said keeper, a support for said latches carried by one of the shaft sections, and a loose connection between the support and the other shaft section, said connection operating during its initial movement to release the latches.

2. The combination with a steering shaft, said shaft being in sections; of a stationary latch keeper, latches engageable with said keeper, a support for the latches carried by one of the shaft sections, a cross bar carried by the other shaft section, guides on the latch support under which the cross bar loosely works, and a connection between said cross bar and the latches for operating the latter.

3. The combination with a steering shaft rotatable about its axis, said shaft being in sections; of a stationary circular rack, a disk mounted on one of the shaft sections, latches carried by the disk and adapted to engage the rack, guides on the disk, a cross bar carried by the other shaft section, and working in the guides, and a connection between the cross bar and the latches for actuating the latter.

4. The combination with a steering shaft, said shaft being in sections; of a stationary latch keeper, a disk carried by one of the shaft sections, a cross bar carried by the other shaft section, latches carried by the disk and having arms extending on opposite sides of the last-mentioned shaft section and engageable by the cross bar, and stops on the disk between which the cross bar operates.

In testimony whereof I affix my signature in presence of two witnesses.

ALPHA A. WAITE.

Witnesses:
ZENE G. WAIT,
LOIS WILSON.